March 6, 1928.
W. LARSEN
1,661,615
LUBRICATING DEVICE FOR MOTORS AND THE LIKE
Filed March 11, 1926
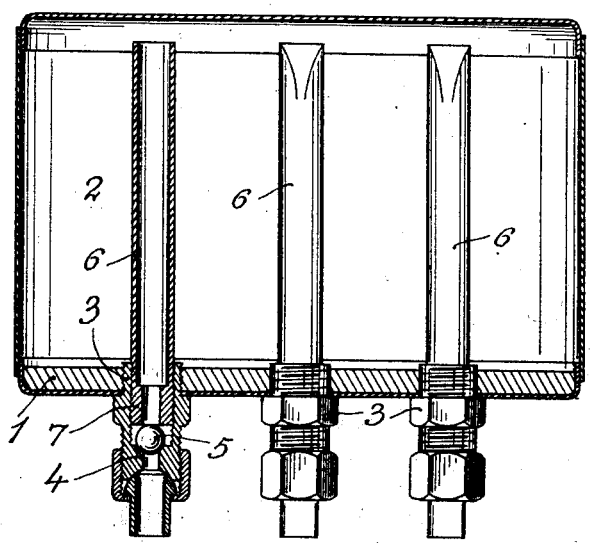
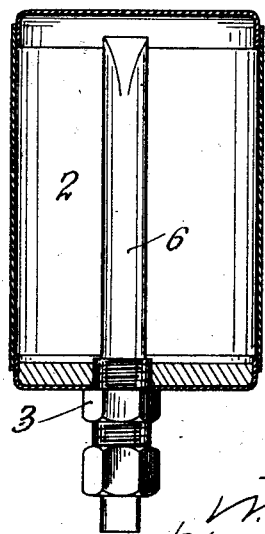
Inventor
W. Larsen
by
Attys.

Patented Mar. 6, 1928.

1,661,615

UNITED STATES PATENT OFFICE.

WALDEMAR LARSEN, OF FREDRIKSSTAD, NORWAY.

LUBRICATING DEVICE FOR MOTORS AND THE LIKE.

Application filed March 11, 1926, Serial No. 94,077, and in Norway March 25, 1925.

Lubricating devices for motors, wherein the lubricating pipes are provided with a non-return valve in the form of a ball, possess the drawback that after wear or the like the stroke of the ball can not be regulated without the members of the device being taken apart. In case of a too long stroke of the ball, it happened, that gas, air under pressure, exhaust or the like returned into the oil container.

According to the present invention this drawback has been overcome by making the part (lubricating pipe) forming the upper abutment for the ball adjustable so that the distance from the abutment to the ball may be adjusted during the run of the motor.

An embodiment of the invention is illustrated in vertical section in the accompanying drawing, wherein Figure 1 is a vertical longitudinal section and Figure 2 a vertical cross section of the device. Figure 3 is a top view of one of the lubricating pipes.

In the lower part 1 of the oil container 2 a pipe nipple 3 is attached which is provided with a seat 4 for the ball 5. In the upper part of the nipple 3 there is screwed in a pipe 6, the lower part 7 of which constitutes an abutment for the ball 5. The pipe 6 is so shaped at its upper end, preferably square in section, that it may be conveniently operated by a suitable tool such as a key or the like, whereby the pipe 6 may be turned for adjusting the distance of the lower pipe and relatively to the ball 5 and thereby regulating the stroke of the ball. This adjustment is most safely and with the least work effected during the run of the motor or machine in question. The pipe 6 may be provided in well known manner with a duct.

The invention may be adapted for use in ordinary oil cups and for pipe conduits for different use. In case, a short pipe is used as an abutment for the ball, said pipe being screwed into a member serving as a valve casing and a valve seat, and after adjustment the said short pipe may be fixed in position relatively to the valve casing by means of a set screw, and the free end of the short pipe and of the valve casing may be screw-threaded for enabling the attachment of the pipe conduit.

Claims:

1. In a lubricating device for motors or the like, the combination of an oil container, an outlet from the same, an oil supply pipe, a non-return valve closing upon an upwardly directed stroke of its movable valve member, said valve being located between said outlet and pipe at the lower end of the latter, an abutment for the movable valve member, the supply pipe being adjustable in the container relatively to the said member and carrying at its lower end the said abutment.

2. In a lubricating device for motors or the like, the combination of an oil container of an oil supply pipe, axially adjustable in the container, an outlet, a non-return valve closing upon an upwardly directed stroke of its movable valve member, said valve being in connection with said pipe for controlling the oil supply to the outlet, the lower end of said pipe forming an adjustable abutment for limiting the upward stroke of the ball.

3. In a lubricating device for motors or the like, the combination with an oil container of a valve casing, a ball therein closing the valve upon an upwardly directed stroke, a separate oil supply pipe in the container screwed adjustably into said casing and made at its inner end with an abutment for limiting the upwardly tightening stroke of the ball adjustably.

4. In a lubricating device for motors or the like, the combination with an oil container of a valve casing, a ball therein closing the valve upon an upwardly directed stroke, a separate oil supply pipe in the container screwed adjustably into said casing and made at its inner end with an abutment for limiting the upwardly tightening stroke of the ball adjustably, said supply pipe projecting up into the oil container and having its upper end shaped so as to be adapted to be operated by a tool for the purpose of adjusting the abutment.

5. In a lubricating device for motors or the like, the combination with an oil container of valve casing, a ball therein closing the valve upon an upwardly directed stroke, a separate oil supply pipe in the container screwed adjustably into said casing and made at its inner end with an abutment for limiting the upwardly tightening stroke of the ball adjustably, said supply pipe projecting up into the oil container and being formed with a square upper end for adjustment purpose.

In testimony that I claim the foregoing as my invention, I have signed my name.

WALDEMAR LARSEN.